United States Patent [19]
Anichini

[11] 3,916,308
[45] Oct. 28, 1975

[54] VISUAL INDICATING DEVICE FOR MEASURING APPARATUS

[75] Inventor: Cesare Anichini, Florence, Italy

[73] Assignee: Finike Italiana Marpos-Soc. In Accomandita Semplice de Mario Possate & C., Bentivoglio, Italy

[22] Filed: May 6, 1974

[21] Appl. No.: 467,227

Related U.S. Application Data

[63] Continuation of Ser. No. 319,880, Dec. 29, 1972, abandoned.

[30] Foreign Application Priority Data

Dec. 30, 1971 Italy .................... 3602/71

[52] U.S. Cl. ............. 324/99 R; 324/99 R; 346/32
[51] Int. Cl.² .................................... G01R 17/06
[58] Field of Search ............. 324/99 R, 100, 163; 346/32

[56] References Cited
UNITED STATES PATENTS 2,448,065  8/1948  Wild ..................... 346/32
3,704,417  11/1972  Davis ..................... 324/163

*Primary Examiner*—Alfred E. Smith
*Assistant Examiner*—Ernest F. Karlsen
*Attorney, Agent, or Firm*—Stevens, Davis, Miller & Mosher

[57] ABSTRACT

A visual indicating device including a two-color tape trained around two opposed pulleys, one of which is motor driven; the ends of the tape are coupled through tensioning springs to a cross-piece which is guided during movement by two longitudinally extending wires, one of which is a resistance wire acting as a linear potentiometer. The voltage at the cross-piece is compared with the voltage output of a measuring device; the resultant difference signal is used to rotate the motor driven pulley, which in turn causes the tape and cross-piece to move along the resistance wire to a point where the difference signal becomes zero and the position of the tape against an adjacent scale indicates the measurements made by the measuring device.

4 Claims, 3 Drawing Figures

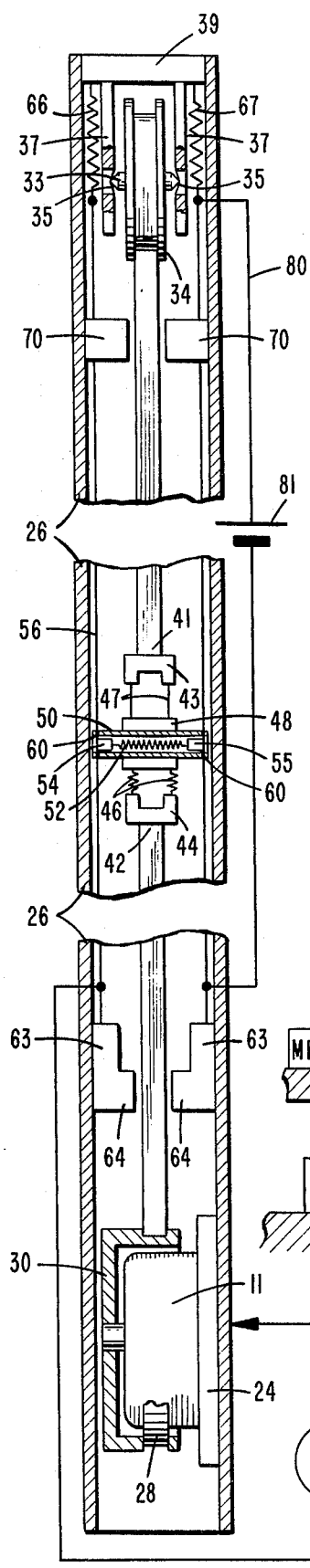
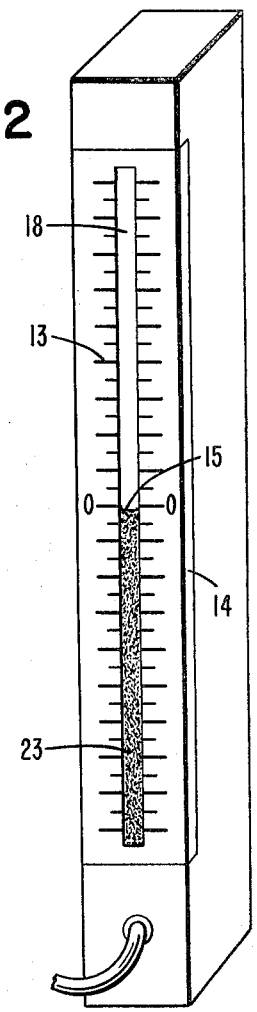
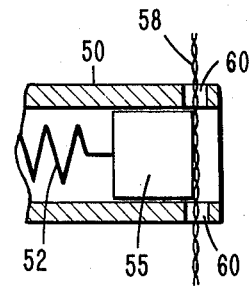
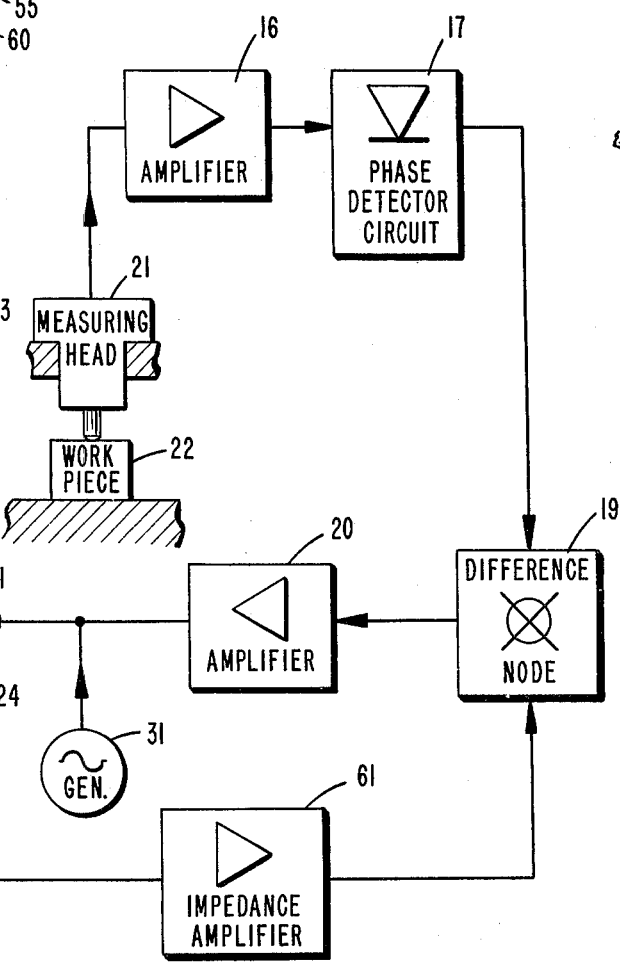

VISUAL INDICATING DEVICE FOR MEASURING APPARATUS

This is a continuation of application Ser. No. 319,880, filed Dec. 29, 1972, now abandoned.

BACKGROUND OF THE INVENTION

1. FIELD OF THE INVENTION

The present invention relates to a visual indicating device for a large-scale measuring apparatus of the type having a movable indicator with vertical scale.

2. DESCRIPTION OF THE PRIOR ART

There are basically two types of devices of this type in general use, namely pneumatic and electromechanical; purely electronic devices, in the case of long scales beyond certain limits, present great technical difficulties and are of prohibitive cost, while purely mechanical devices are lacking greatly in precision.

The pneumatic devices, which are based generally on the principle of supporting a body at a variable height as a function of the feed pressure, are characterized by a lack of linearity, by poor reproducibility, and therefore in general by poor precision. Furthermore, they have very long response times.

The electromechanical devices known at the present time are very complicated, comprising a feed system for the movement of the visual indicator, generally an electric motor, a system for frictionally connecting the indicator and the feed system, and a system for stopping the indicator in the desired position. The operation of the device is rather unreliable due to the large number of moving parts and is of low precision due to the inevitable friction and inertia. The moving parts are furthermore subject to wear and therefore have a very short life. Finally, cost of a device of this type is usually quite high.

SUMMARY OF THE INVENTION

The present invention is directed to solving the technical problem of providing a visual indicating device which has a very long scale, can be connected to electronic measuring apparatus, has small moving masses so as to have very low inertia, is linear over the entire scale, and finally makes it possible to position the indicator at any point of the scale without being impaired by possible friction.

This problem is solved by the device constructed in accordance with the present invention which comprises means for detecting a signal representative of the variable to be measured and characterized by means adapted to supply a signal which is dependent on the position of the measuring indicator, the law of variation being the same for both signals upon variation of the corresponding variable, means for the comparison of these two signals and means for displacing the indicator, which are controlled by the comparison means and are adopted to interrupt the displacement when the comparison means supplies a zero signal to the indicator.

BRIEF DESCRIPTION OF THE DRAWINGS

The following description covers a preferred embodiment of the invention, given by way of illustration and not of limitation, with reference to the accompanying drawings in which:

FIG. 1 shows schematically a side view partially in section of the device according to the invention and an electronic control system for said device;

FIG. 2 is a perspective view of the device of the invention; and

FIG. 3 shows a detail of the device of FIG. 1, on a larger scale.

DESCRIPTION OF THE PREFERRED EMBODIMENT

Referring to FIG. 1, a motor 11 is supplied with a drive signal by an electrical circuit composed of an amplifier 16, a phase detector circuit 17, a difference node 19 and a second amplifier 20; the signal source for this circuit constitutes a signal detected by a measuring head 21, which indicates the dimension of a work piece 22 or other member being measured. The motor 11 is arranged on a support 24, fastened to the outer frame 26 of the device.

A pulley 30 is keyed on the shaft of motor 11 and an indicating tape 28 is wound on pulley 30. The tape 28 is also wound onto a second pulley 34 opposite the pulley 30. The pulley 34 is mounted within the frame work 26 for rotation with a pin 33, the conical ends of which are seated in two cavities 35, also conical, provided in two members 37, each of which is fastened to and hangs from an insulating support 39 connected to the outer frame 26. Each end 41 and 42 of the tape 28 is fastened to two corresponding tape stop supports 43 and 44. The tape 28 is held under tension by two springs 46, each of which has one end fastened to the support 44 and the opposite end fastened to an insulating plate 48 to which the tape stop 43 is also connected by two wires 47. To the plate 48 is fastened a hollow cylinder 50 within which is arranged a spring 52, the ends of which are connected to two pawls 54 and 55, respectively, of conductive material. The pawls 54 and 55 are maintained in contact with two guide wires 56 and 58, respectively, which pass through two holes 60 provided in the cylinder 50. Wire 58 is a resistive wire made of a suitable metal alloy, whose resistance varies in a linear manner as a function of its length; wire 56 may be made of a conducting material or may be made from the same resistive material as wire 58.

Wires 56 and 58 extend parallel to each other within the frame 26 and are fastened at the bottom to two insulating supports 63 connected with the frame 26. The supports 63 are provided with two stop fins 64 for limiting the travel of the support 44. The wires 56 and 58 are connected at the top with two springs 66 and 67 fastened to the insulating support 39 and adapted to maintain the wires under tension. The support 43 cooperates with two fins 70 mounted on the frame 26 to define the upward travel limit of the tape 28.

The resistance wire 58 is supplied with a source of direct voltage 81 through lead 80 so that a voltage appears on the wire 56, through pawl 55, spring 52 and pawl 54; the value of this voltage will depend on the position of the pawl 55 on wire 58. This voltage is amplified in a high input impedance amplifier 61 and then applied to the differential node 19.

Mechanically, each of the wires 56 and 58 is formed of two strands tightly wound together (FIG. 3). In this way a better contact between the wires and the corresponding pawls 54 and 55 is assured. Furthermore, stranding the wires avoids catching them in the slits which are produced in the pawls 54 and 55 with use over a period of time. By using wound cables, the slits which are produced are of a width greater than that of the wires, while with a single cable the slit would be of a width equal to the diameter of the wires, and therefore would more easily catch on the pawl.

The tape 28 is formed of two segments 18 and 23 (FIG. 2) of different colors and the line 15 which divides them constitutes the indicator index for the measured values which may be indicated on a scale 13 drawn on a board 14 of the indicating device. The board 14 is formed of transparent material and is applied against the front part of the device; it therefore can easily be replaced to adapt the reading scale to the particular requirements desired.

The device operates in the following manner.

The output signal of the measuring head 21 is amplified by the amplifier 16 and sent to the phase detector circuit 17. The output voltage of the circuit 17 is thereupon applied to the comparison or difference signal generating circuit 19 along with the voltage present on the wire 56, which indicates the current position of the measurement indicator 15 on the indicating scale 13. The difference signal output of circuit 19 is amplified in amplifier 20 and comprises the signal to the motor 11 to displace the tape 28 and therefore the indicator 15 in the proper direction dependent on the sign of the signal. The displacement continues until the output signal from the difference signal generator 19 becomes essentially zero.

Under these conditions, the indicator 15 remains accurately positioned to indicate the value of the measurement of part 22. Since both the signal supplied from the wire 58, through the pawls 55 and 54 and wire 56, and the signal supplied by the measuring head 21 are linear, there is an exact correspondence between the two laws of variation and therefore an exact correspondence over the entire scale between the position of the indicator 15 and the measurement detected by the measuring head 21.

In order to further reduce errors due to the presence of friction, which might affect the movement of the tape 28 and the measurement indicator by positioning it on a point of the scale not corresponding to the actual value of the measurement being made, a generator 31 introduces an alternating signal of an average value of zero in to the motor to cause small oscillations in the rotor thereof; the oscillations produced by this signal cause the motor to vibrate around the position of equilibrium, permitting the tape 28 and therefore the measuring indicator 15 to come to rest on the position intended to be reached.

What is claimed is:

1. A visual indicating device for large scale measuring apparatus of the moving indicator type, comprising:
   a frame;
   a moving indicator including two opposite pulleys, carried by said frame and a movable tape wound on said opposite pulleys;
   a potentiometer and guide means including
   a voltage source,
   a first wire arranged adjacent to said tape and supplied by said voltage source,
   first tensioning means coupled to said frame and to the first wire for maintaining the wire under tension and in a position linearly extending parallel to said tape,
   a second wire adjacent to said tape at the opposite side of the tape with respect to said first wire,
   second tensioning means coupled to said frame and to the second wire for maintaining the second wire under tension and in a position linearly extending parallel to said tape,
   a cross-piece carried by said tape and including a hollow cylinder having opposed first and second end surfaces, said first and second wires cooperating with said first and second end surfaces, respectively, for providing a guide to the cross-piece, and
   electrical contact moving means including a first and a second conductive pawls slidable within said cylinder, and a spring the ends of which are electrically connected to the pawls, said pawls being adapted to resiliently cooperative with said first and second wires, respectively, for making electrical contact thereon and providing a voltage depending on the position of the tape;
   comparison means connected to said second wire and adapted to compare said voltage depending on the position of the tape with a voltage depending on the variable to be measured; and
   motor means supplied by said comparison means for displacing the tape.

2. The indicating device according to claim 1, wherein the end surfaces of said cross-piece cooperating with said first and second wires for providing guides to said cross-piece define holes at the ends of said cylinder, said first and second wires passing through said holes, said spring urging said conductive pawls against the wires for making electrical contact thereon, said spring transmitting the voltage at the contact point between said first wire and the relevant pawl to said second wire, through the relevant pawl cooperating therewith.

3. The indicating device according to claim 2, wherein said first and second wires are formed of at least two strands tightly would together, said strands being adapted to assure electrical contact with said pawls without being caught by them.

4. The indicating device according to claim 3, wherein each of said first and second wires is connected at its ends to insulated supports associated to said frame, a spring being inserted between one of said ends of each wire and the corresponding insulated support.

* * * * *

UNITED STATES PATENT OFFICE
CERTIFICATE OF CORRECTION

PATENT NO. : 3,916,308
DATED : October 28, 1975
INVENTOR(S) : Cesare ANICHINI

It is certified that error appears in the above—identified patent and that said Letters Patent are hereby corrected as shown below:

[73] Assignee: Line 3, cancel "Possate" and insert -- Possati --.

Signed and Sealed this twenty-ninth Day of June 1976

[SEAL]

Attest:

RUTH C. MASON
Attesting Officer

C. MARSHALL DANN
Commissioner of Patents and Trademarks